(12) United States Patent
Janson

(10) Patent No.: US 9,644,723 B2
(45) Date of Patent: May 9, 2017

(54) MULTI-SPEED TRANSMISSION WITH LAY SHAFT

(71) Applicant: FORD GLOBAL TECHNOLOGIES, LLC, Dearborn, MI (US)

(72) Inventor: David Allen Janson, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 162 days.

(21) Appl. No.: 14/296,762

(22) Filed: Jun. 5, 2014

(65) Prior Publication Data

US 2015/0354680 A1   Dec. 10, 2015

(51) Int. Cl.
*F16H 37/04*   (2006.01)
*F16H 3/66*   (2006.01)

(52) U.S. Cl.
CPC ............ *F16H 37/042* (2013.01); *F16H 3/66* (2013.01); *F16H 2037/048* (2013.01); *F16H 2200/0056* (2013.01); *F16H 2200/201* (2013.01); *F16H 2200/2007* (2013.01); *F16H 2200/2046* (2013.01); *Y10T 74/19614* (2015.01)

(58) Field of Classification Search
CPC ............ F16H 2037/048; F16H 37/042; F16H 2200/0056; F16H 2200/201; F16H 2200/2043; F16H 2200/2046
USPC ........................................................ 475/277
See application file for complete search history.

(56) References Cited

U.S. PATENT DOCUMENTS

| | | | |
|---|---|---|---|
| 6,827,664 B2 | 12/2004 | Stevenson et al. | |
| 6,958,031 B2 * | 10/2005 | Diosi | F16H 3/66 475/276 |
| 7,131,925 B2 * | 11/2006 | Shim | F16H 3/66 475/277 |
| 7,648,437 B2 * | 1/2010 | Raghavan | F16H 3/728 475/149 |
| 7,841,960 B2 | 11/2010 | Baldwin | |
| 2006/0128517 A1 * | 6/2006 | Tiesler | F16H 3/66 475/276 |
| 2008/0070742 A1 * | 3/2008 | Phillips | F16H 37/0833 475/331 |
| 2009/0209389 A1 | 8/2009 | Phillips et al. | |
| 2012/0122626 A1 | 5/2012 | Gumpoltsberger et al. | |
| 2012/0149526 A1 | 6/2012 | Gumpoltsberger et al. | |
| 2012/0165154 A1 * | 6/2012 | Wittkopp | F16H 3/663 475/296 |
| 2013/0029799 A1 | 1/2013 | Park et al. | |
| 2013/0040776 A1 | 2/2013 | Mellet et al. | |
| 2013/0085032 A1 | 4/2013 | Mellet et al. | |
| 2013/0157796 A1 | 6/2013 | Etchason | |
| 2013/0203546 A1 | 8/2013 | Mellet et al. | |
| 2014/0128205 A1 * | 5/2014 | Phillips | F16H 37/04 475/303 |

\* cited by examiner

*Primary Examiner* — Stacey Fluhart
(74) *Attorney, Agent, or Firm* — James Dottavio; Brooks Kushman P.C.

(57) ABSTRACT

A transmission gearing arrangement produces seven forward speed ratios and one reverse speed ratio by selective engagement of two shift elements in various combinations. Some embodiment includes three simple planetary gearsets in conjunction with two axis transfer gear pairs and a layshaft. Another embodiment includes an additional two axis transfer gear pairs and layshaft in place of one of the planetary gearsets.

20 Claims, 3 Drawing Sheets

MULTI-SPEED TRANSMISSION WITH LAY SHAFT

TECHNICAL FIELD

This disclosure relates to the field of automatic transmissions for motor vehicles. More particularly, the disclosure pertains to an arrangement of gears, clutches, and the interconnections among them in a power transmission.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

SUMMARY

In a first embodiment, a transmission includes input and output shafts and first, second, third, and fourth shafts. The transmission additionally includes a first gearing arrangement configured to selectively constrain the first shaft to rotate faster than the output shaft and in a same direction. The first gearing arrangement may be, for example, a simple planetary gearset in combination with a brake. The transmission further includes a second gearing arrangement configured to fixedly impose a linear speed relationship among the input shaft, the first shaft, and the second shaft. The second gearing arrangement may be, for example, a simple planetary gearset. The transmission additionally includes a third gearing arrangement configured to fixedly impose a linear speed relationship among the third shaft, second shaft, and output shaft. The third gearing arrangement may be, for example, a simple planetary gearset. The transmission further includes a fourth gearing arrangement configured to selectively constrain the output shaft to rotate faster than the input shaft and in a same direction. The fourth gearing arrangement may be, as another example, a collection of axis transfer gears in combination with a clutch. The transmission also includes a first clutch selectively coupling the input shaft to the second shaft, a second clutch selectively coupling the input shaft to the third shaft, a first brake selectively holding the second shaft against rotation, and a second brake selectively holding the third shaft against rotation.

In a second embodiment, a transmission includes a plurality of planetary gearsets and a plurality of shift elements configured to selectively establish a plurality of forward speed ratios and a reverse speed ratio between an input shaft and an output shaft. The transmission also includes a layshaft gearset and a first clutch. The layshaft gearset and clutch are configured to fixedly establish a final drive ratio between the output shaft and a differential and selectively establish an overdrive speed relationship between the input shaft and the output shaft.

In a third embodiment, a transmission includes an input shaft, an output shaft, and first, second, third, fourth, fifth, sixth, and seventh shafts. The transmission additionally includes first, second, and third brakes and first, second, and third clutches. The transmission further includes a first gearing arrangement configured to fixedly impose a linear speed relationship among the input shaft, the first shaft, and the second shaft; a second gearing arrangement configured to fixedly impose a linear speed relationship among the third shaft, the output shaft, and the fourth shaft; and a third gearing arrangement configured to fixedly impose a linear speed relationship among the fifth shaft, the sixth shaft, and the seventh shaft. The transmission also includes a layshaft substantially parallel to the input shaft. The third clutch is configured to selectively constrain the output shaft to rotate faster than the input shaft and in a same direction via the layshaft.

DETAILED DESCRIPTION

Figure 1:
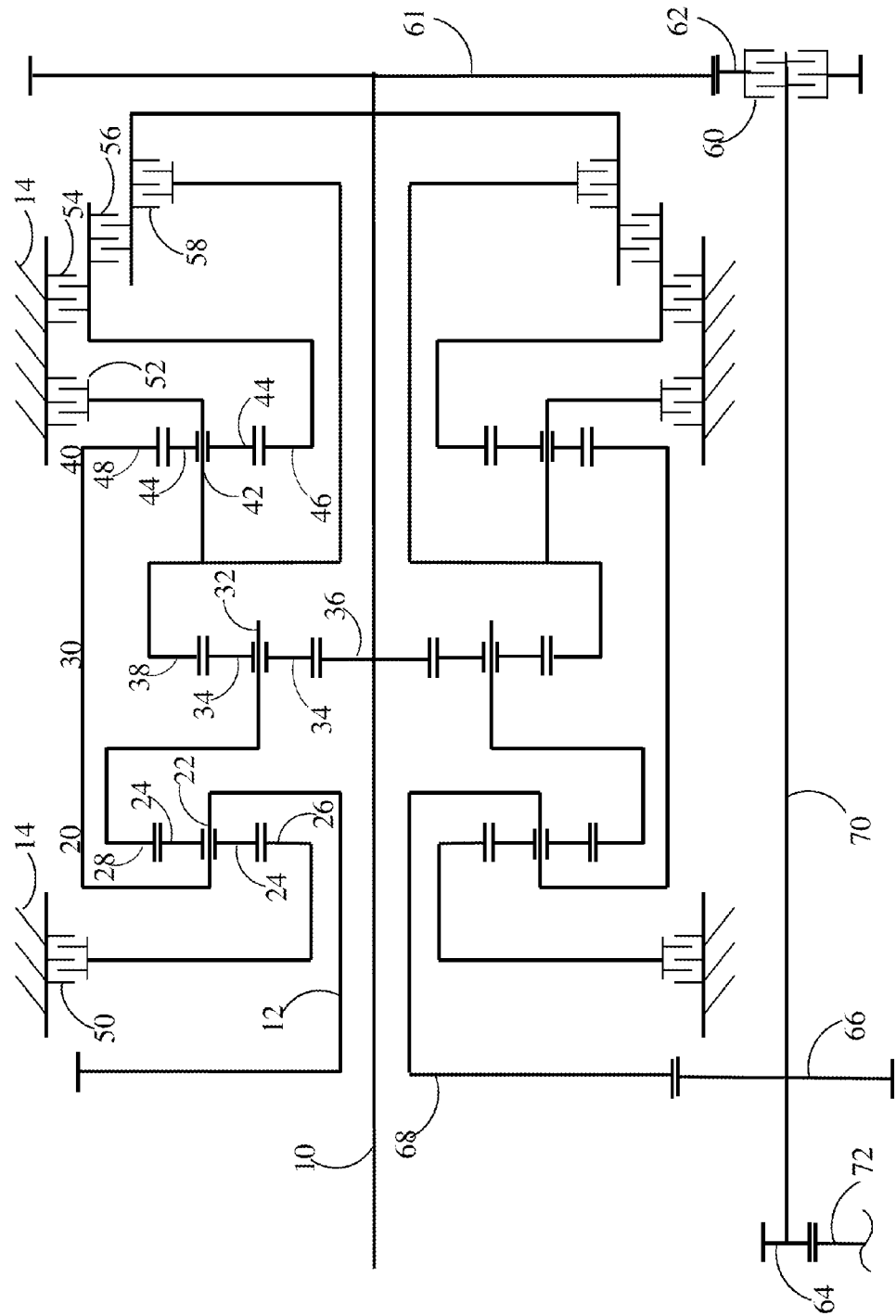
FIG. 1 is a schematic diagram of a first transmission gearing arrangement.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A gearing arrangement is a collection of rotating elements and shift elements configured to impose specified speed relationships among the rotating elements. Some speed relationships, called fixed speed relationships, are imposed regardless of the state of any shift elements. Other speed relationships, called selective speed relationships, are imposed only when particular shift elements are fully engaged. A linear speed relationship exists among an ordered list of rotating elements when i) the first and last rotating element in the group are constrained to have the most extreme speeds, ii) the speeds of the remaining rotating elements are each constrained to be a weighted average of the first and last rotating element, and iii) when the speeds of the rotating elements differ, they are constrained to be in the listed order, either increasing or decreasing. The speed of an element is positive when the element rotates in one direction and negative when the element rotates in the opposite direction. A discrete ratio transmission has a gearing arrangement that selectively imposes a variety of speed ratios between an input shaft and an output shaft.

A group of rotating elements are fixedly coupled to one another if they are constrained to rotate as a unit in all operating conditions. Rotating elements can be fixedly coupled by spline connections, welding, press fitting, machining from a common solid, or other means. Slight variations in rotational displacement between fixedly coupled elements can occur such as displacement due to lash or shaft compliance. One or more rotating elements that are all fixedly coupled to one another may be called a shaft. In contrast, two rotating elements are selectively coupled by a shift element when the shift element constrains them to rotate as a unit whenever it is fully engaged and they are free to rotate at distinct speeds in at least some other operating condition. A shift element that holds a rotating element against rotation by selectively connecting it to the housing is called a brake. A shift element that selectively couples two or more rotating elements to one another is called a clutch. Shift elements may be actively controlled devices such as hydraulically or electrically actuated clutches or brakes or may be passive devices such as one way clutches or brakes. Two rotating elements are coupled if they are either fixedly coupled or selectively coupled.

An example transmission is schematically illustrated in FIG. 1. The transmission utilizes three simple planetary gearsets 20, 30, and 40. A planet carrier 22 rotates about a central axis and supports a set of planet gears 24 such that the planet gears rotate with respect to the planet carrier. External gear teeth on the planet gears mesh with external gear teeth on a sun gear 26 and with internal gear teeth on a ring gear 28. The sun gear and ring gear are supported to rotate about the same axis as the carrier. Gearsets 30 and 40 are similarly structured.

A simple planetary gearset is a type of gearing arrangement that imposes a fixed linear speed relationship among the sun gear, the planet carrier, and the ring gear. Other known types of gearing arrangements also impose a fixed linear speed relationship among three rotating elements. For example, a double pinion planetary gearset imposes a fixed linear speed relationship between the sun gear, the ring gear, and the planet carrier.

A suggested ratio of gear teeth for each planetary gearset is listed in Table 1.

TABLE 1

| Ring 28/Sun 26 | 2.243 |
| Ring 38/Sun 36 | 2.171 |
| Ring 48/Sun 46 | 2.943 |
| Gear 62/Gear 68 | 2.0 |

In the transmission of FIG. 1, input shaft 10 is fixedly coupled to sun 36, selectively coupled to intermediate sun 46 by clutch 56, and selectively coupled to ring 38 and carrier 42 by clutch 58. Output shaft 12 is fixedly coupled to carrier 22 and ring gear 48. Sun gear 26 is selectively held against rotation to transmission case 14 by brake 50. Ring gear 28 is fixedly coupled to carrier 32. Ring gear 38 is fixedly coupled to carrier 42 and selectively held against rotation by brake 52. Sun gear 46 is selectively held against rotation by brake 54. Additionally, axis transfer gears 61 and 68 are supported for rotation about the central axis of simple planetary gearsets 20, 30, and 40. Axis transfer gear 61 is fixedly coupled with the input shaft 10 and axis transfer gear 68 is fixedly coupled with output shaft 12. Gear 61 is radially larger than gear 68. Layshaft 70 is parallel to the central axis but offset from the central axis. Axis transfer gears 62, 64, and 66 are supported for rotation about the axis of layshaft 70. Axis transfer gear 62 is selectively coupled to layshaft 70 by clutch 60, and axis transfer gears 64 and 66 are fixedly coupled with layshaft 70. Axis transfer gears 62 and 66 continuously mesh with axis transfer gears 61 and 68 respectively. Gear 64 continuously meshes with gear 72. Gear 72 may be connected to a differential. Layshaft 70 and the associated gears thus fixedly establish a final drive ratio between the output shaft and a differential.

Various combinations of gearsets, clutches, and brakes selectively impose particular speed relationships. The combination of gearset 20 and brake 50 selectively imposes an overdrive relationship between carrier 22 and ring gear 28. In other words, ring gear 28 is constrained to rotate faster than carrier 22 and in the same direction when brake 50 is engaged. Similarly, the combination of gearset 30 and brake 52 selectively imposes an overdrive relationship between carrier 32 and sun gear 36. The combination of gearset 30, input shaft 10, and clutch 58 selectively constrains ring gear 38 and carrier 32 to commonly rotate with input shaft 10. The combination of gearset 40, brake 54, and clutch 56 selectively imposes various speed relationships among sun gear 46, carrier 42, and ring gear 48. The aforementioned gearsets, clutches, and brakes cooperatively define six forward speeds and a reverse speed between the input shaft 10 and the output shaft 12. The layshaft 70 and axis transfer gears 62, 64, 66, and 68, in conjunction with clutch 60, selectively impose an overdrive speed relationship between the input shaft and the output shaft to define a seventh forward speed.

As shown in Table 2, engaging the shift elements in combinations of two establishes seven forward speed ratios and one reverse speed ratio between input shaft 10 and output shaft 12. An X indicates that the shift element is required to establish the speed ratio. When the gearsets have tooth number ratios as indicated in Table 1, the speed ratios have the values indicated in Table 2.

TABLE 2

|      | 50/84 | 52 | 54 | 56 | 58 | 60 | Ratio | Step |
|------|-------|----|----|----|----|----|-------|------|
| Rev. |       | X  |    | X  |    |    | -2.943 | 64.2% |
| 1st  | X     | X  |    |    |    |    | 4.584 |       |
| 2nd  | X     |    | X  |    |    |    | 2.964 | 1.55 |
| 3rd  | X     |    |    | X  |    |    | 1.912 | 1.55 |
| 4th  | X     |    |    |    | X  |    | 1.446 | 1.32 |
| 5th  |       |    |    | X  | X  |    | 1.000 | 1.45 |
| 6th  |       |    | X  |    | X  |    | 0.746 | 1.34 |
| 7th  |       |    |    |    | X  | X  | 0.500 | 1.49 |

When the driver selects drive (forward), the transmission is prepared for vehicle launch in 1st gear by engaging clutches 50 and 52. A shift to 2nd gear may be accomplished by gradually disengaging clutch 52 while gradually engaging clutch 54. Additional upshifts are accomplished according to Table 2. When the driver selects reverse gear, the transmission is prepared for vehicle launch in reverse by engaging clutches 52 and 56.

Figure 2:
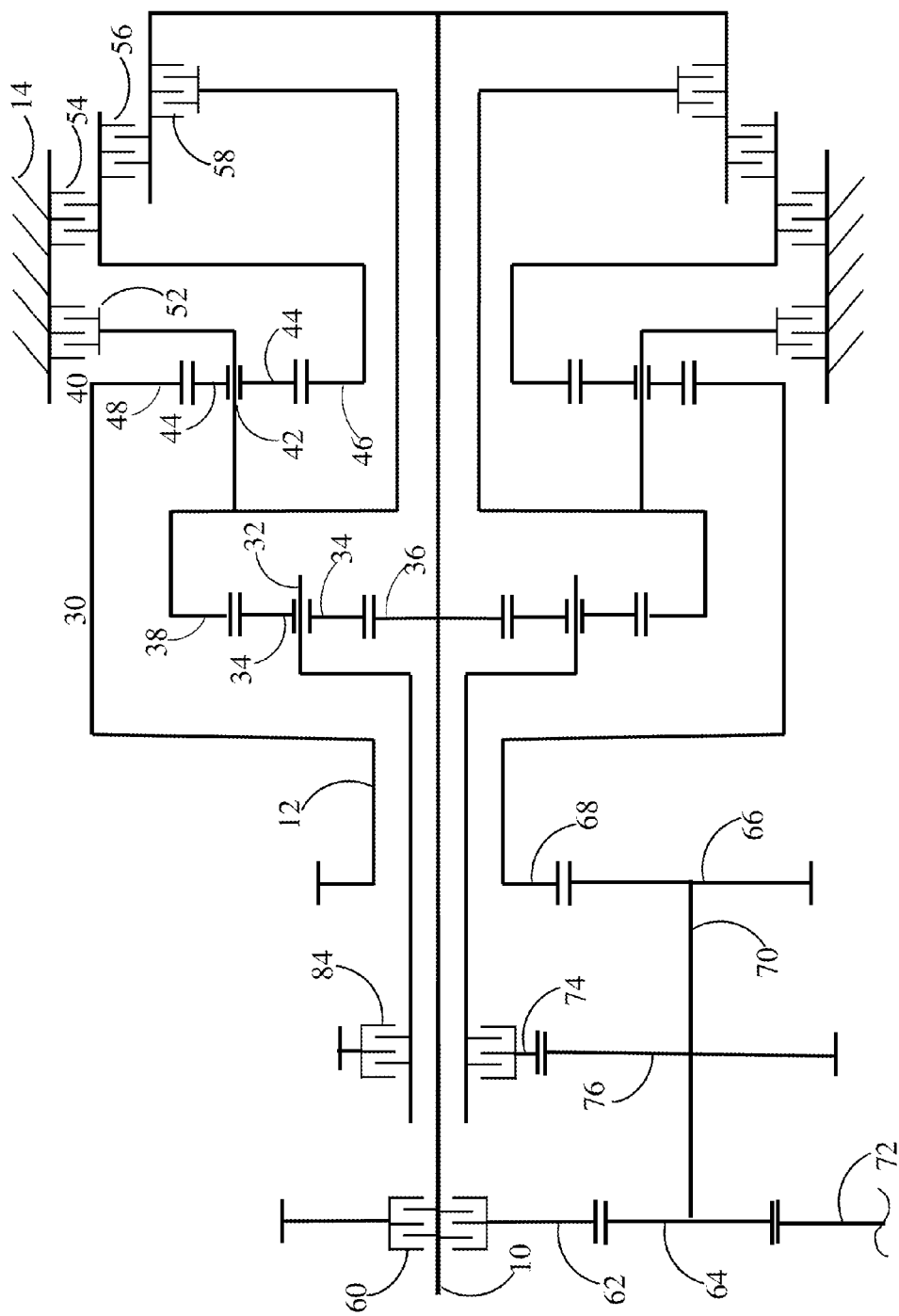
FIG. 2 is a schematic diagram of a second transmission gearing arrangement.

A second example transmission is illustrated in FIG. 2. This transmission utilizes two simple planetary gearsets 30 and 40 with suggested tooth number ratios as shown in Table 1. In this transmission, input shaft 10 is fixedly coupled to sun 36, selectively coupled to sun 46 by clutch 56, and selectively coupled to ring 38 and carrier 42 by clutch 58. Output shaft 12 is fixedly coupled to ring gear 48. Ring gear 38 is fixedly coupled to carrier 42 and selectively held against rotation by brake 52. Sun gear 46 is selectively held against rotation by brake 54. Axis transfer gears 74 and 68 are supported for rotation about the central axis of simple planetary gearsets 30 and 40. Axis transfer gear 74 is selectively coupled with carrier 32 by clutch 84. Axis transfer gear 68 is fixedly coupled to output shaft 12. Gear 68 is radially larger than gear 74. Layshaft 70 is parallel to the central axis but offset from the central axis. Axis transfer gears 64, 66, and 76 are fixedly coupled to layshaft 70. Axis transfer gears 76 and 66 continuously mesh with axis transfer gears 74 and 68 respectively. Additionally, axis transfer gear 62 is supported for rotation about the central axis of simple planetary gearsets 30 and 40. Axis transfer gear 62 is selectively coupled with the input shaft 10 by clutch 60. Gear 62 is radially larger than gear 68. Axis transfer gear 64 continuously meshes with axis transfer gear 62. Torque is transferred from output shaft 12 to vehicle wheels (not illustrated) via gearing element 72. The transmission of FIG. 2 is operated in the same fashion as the transmission of FIG. 1.

Various combinations of gearsets, clutches, and brakes selectively impose particular speed relationships. The combination of layshaft 70, axis transfer gears 74, 76, 66, and 68, and clutch 84 selectively imposes an overdrive relationship between output shaft 12 and carrier 32. Similarly, the combination of gearset 30 and brake 52 selectively imposes an overdrive relationship between carrier 32 and sun gear 36. The combination of gearset 30, input shaft 10, and clutch 58 selectively constrains ring gear 38 and carrier 32 to commonly rotate with input shaft 10. The combination of gearset 40, brake 54, and clutch 56 selectively imposes various speed relationships among sun gear 46, carrier 42, and ring gear 48. The aforementioned gearsets, clutches, and brakes cooperatively define six forward speeds and a reverse speed between the input shaft 10 and the output shaft 12. The layshaft 70 and axis transfer gears 62, 64, 66, and 68, in conjunction with clutch 60, selectively impose an overdrive speed relationship between the input shaft and the output shaft to define a seventh forward speed. Torque is transferred from output shaft 12 to vehicle wheels (not illustrated) via gearing element 72.

Figure 3:
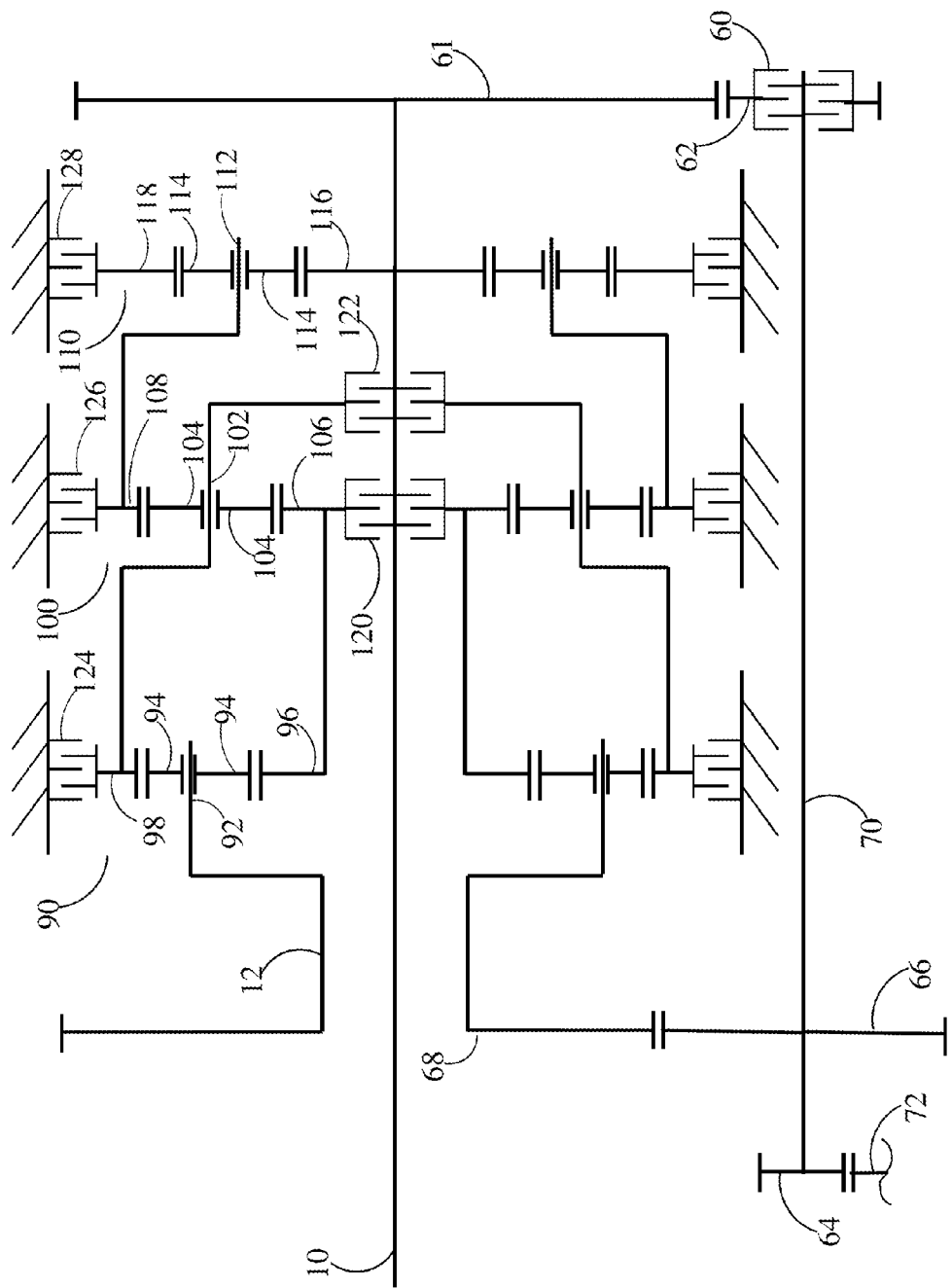
FIG. 3 is a schematic diagram of a third transmission gearing arrangement.

A third example transmission is illustrated in FIG. 3. This transmission utilizes three simple planetary gearsets 90, 100, and 110 with suggested tooth number ratios as shown in Table 3.

TABLE 3

| Ring 98/Sun 96 | 2.85 |
| Ring 108/Sun 106 | 2.74 |
| Ring 118/Sun 116 | 1.89 |
| Gear 62/Gear 68 | 2.0 |

In this transmission, input shaft 10 is fixedly coupled to sun 116, selectively coupled to suns 96 and 106 by clutch 120, and selectively coupled to carrier 102 and ring 98 by clutch 122. Output shaft 12 is fixedly coupled to carrier 92. Ring gear 98 is selectively held against rotation by brake 124. Ring gear 108 is fixedly coupled to carrier 112 and selectively held against rotation by brake 126. Ring gear 118 is selectively held against rotation by brake 128. Additionally, axis transfer gears 61 and 68 are supported for rotation about the central axis of simple planetary gearsets 20, 30, and 40. Axis transfer gear 61 is fixedly coupled with the input shaft 10 and axis transfer gear 68 is fixedly coupled with output shaft 12. Gear 61 is radially larger than gear 68. Layshaft 70 is parallel to the central axis but offset from the central axis. Axis transfer gears 62, 64, and 68 are supported for rotation about the axis of layshaft 70. Axis transfer gear 62 is selectively coupled to layshaft 70 by clutch 60, and axis transfer gears 64 and 66 are fixedly coupled with layshaft 70. Axis transfer gears 62 and 66 continuously mesh with axis transfer gears 61 and 68 respectively. Gear 64 continuously meshes with gear 72.

Various combinations of gearsets, clutches, and brakes selectively impose particular speed relationships. The combination of gearset 90 and brake 124 selectively imposes an overdrive relationship between output shaft 12 and sun gear 96. Similarly, the combination of gearset 100 and brake 126 selectively imposes an overdrive relationship between carrier 102 and sun gear 106. The combination of gearset 110 and brake 128 selectively imposes an overdrive relationship between carrier 112 and sun gear 116. The aforementioned gearsets, clutches, and brakes cooperatively define six forward speeds and a reverse speed between the input shaft 10 and the output shaft 12. The layshaft 70 and axis transfer gears 62, 64, 66, and 68, in conjunction with clutch 60, selectively impose an overdrive speed relationship between the input shaft and the output shaft to define a seventh forward speed. Torque is transferred from output shaft 12 to vehicle wheels (not illustrated) via gearing element 72.

As shown in Table 2, engaging the shift elements in combinations of two establishes seven forward speed ratios and one reverse speed ratio between input shaft 10 and output shaft 12.

TABLE 4

|  | 120 | 122 | 124 | 126 | 128 | 60 | Ratio | Step |
| --- | --- | --- | --- | --- | --- | --- | --- | --- |
| Rev. |  |  | X |  | X |  | −4.061 | 105.5% |
| 1st | X |  | X |  |  |  | 3.850 |  |
| 2nd | X |  |  | X |  |  | 2.185 | 1.76 |
| 3rd | X |  |  |  | X |  | 1.550 | 1.41 |
| 4th | X | X |  |  |  |  | 1.000 | 1.55 |
| 5th |  | X |  |  | X |  | 1.682 | 1.47 |
| 6th |  | X |  | X |  |  | 0.584 | 1.17 |
| 7th |  | X |  |  |  | X | 0.500 | 1.17 |

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A transmission comprising:
   an input shaft;
   an output shaft;
   first, second, third, and fourth shafts;

a first gearing arrangement configured to selectively constrain the first shaft to rotate faster than the output shaft and in a same direction;
a second gearing arrangement configured to fixedly impose a linear speed relationship among the input shaft, the first shaft, and the second shaft;
a third gearing arrangement configured to fixedly impose a linear speed relationship among the third shaft, the second shaft, and the output shaft;
a first clutch configured to selectively couple the input shaft to the second shaft;
a second clutch configured to selectively couple the input shaft to the third shaft;
a first brake configured to selectively hold the second shaft against rotation;
a second brake configured to selectively hold the third shaft against rotation;
a first layshaft substantially parallel to the input shaft;
a first axis transfer gear fixedly coupled to the input shaft;
a second axis transfer gear in continuous meshing engagement with the first axis transfer gear;
a third clutch configured to selectively couple the second axis transfer gear to the layshaft;
a third axis transfer gear coupled to the output shaft; and
a fourth axis transfer gear coupled to the first layshaft and in continuous meshing engagement with the third axis transfer gear.

2. The transmission of claim 1, wherein the first gearing arrangement comprises:
a first simple planetary gearset having a first sun gear, a first ring gear fixedly coupled to the first shaft, a first planet carrier fixedly coupled to the output shaft, and at least one planet gear supported for rotation on the first planet carrier and in continuous meshing engagement with the first sun gear and the first ring gear; and
a third brake configured to selectively hold the first sun gear against rotation.

3. The transmission of claim 1, wherein the second gearing arrangement comprises:
a second simple planetary gearset having a second sun gear fixedly coupled to the input shaft, a second ring gear fixedly coupled to the second shaft, a second planet carrier fixedly coupled to the first shaft, and at least one planet gear supported for rotation on the second planet carrier and in continuous meshing engagement with the second sun gear and the second ring gear.

4. The transmission of claim 1, wherein the third gearing arrangement comprises:
a third simple planetary gearset having a third sun gear fixedly coupled to the third shaft, a third ring gear fixedly coupled to the output shaft, a third planet carrier fixedly coupled to the second shaft, and at least one planet gear supported for rotation on the third planet carrier and in continuous meshing engagement with the third sun gear and the third ring gear.

5. A transmission comprising:
an input shaft;
a first axis transfer gear supported for rotation about the input shaft;
a gearing arrangement having only five shift elements configured to selectively establish six forward speed ratios and a reverse speed ratio between the input shaft and the first axis transfer gear; and
a layshaft gearing arrangement configured to selectively establish a seventh forward speed ratio between the input shaft and the first axis transfer gear.

6. The transmission of claim 5, wherein the plurality of planetary gearsets includes:
a first planetary gearset having a first sun gear, a first ring gear fixedly coupled to a first shaft, a first planet carrier fixedly coupled to the first axis transfer gear, and at least one planet gear supported for rotation on the first planet carrier and in continuous meshing engagement with the first sun gear and the first ring gear;
a second planetary gearset having a second sun gear fixedly coupled to the input shaft, a second ring gear fixedly coupled to a second shaft, a second planet carrier fixedly coupled to the first shaft, and at least one planet gear supported for rotation on the second planet carrier and in continuous meshing engagement with the second sun gear and the second ring gear; and
a third planetary gearset having a third sun gear fixedly coupled to a third shaft, a third ring gear fixedly coupled to the first axis transfer gear, a third planet carrier fixedly coupled to the second shaft, and at least one planet gear supported for rotation on the third planet carrier and in continuous meshing engagement with the third sun gear and the third ring gear.

7. The transmission of claim 6, further comprising:
a first clutch configured to selectively couple the input shaft to the second shaft;
a second clutch configured to selectively couple the input shaft to the third shaft;
a first brake configured to selectively hold the second shaft against rotation;
a second brake configured to selectively hold the third shaft against rotation; and
a third brake configured to selectively hold the first sun gear against rotation.

8. The transmission of claim 5, wherein the plurality of planetary gearsets includes:
a first planetary gearset having a first sun gear fixedly coupled to a first shaft, a first ring gear fixedly coupled to a second shaft, a first planet carrier fixedly coupled to the first axis transfer gear, and at least one planet gear supported for rotation on the first planet carrier and in continuous meshing engagement with the first sun gear and the first ring gear;
a second planetary gearset having a second sun gear fixedly coupled to the first shaft, a second ring gear fixedly coupled to a third shaft, a second planet carrier fixedly coupled to the second shaft, and at least one planet gear supported for rotation on the second planet carrier and in continuous meshing engagement with the second sun gear and the second ring gear; and
a third planetary gearset having a third sun gear fixedly coupled to the input shaft, a third ring gear, a third planet carrier fixedly coupled to the third shaft, and at least one planet gear supported for rotation on the third planet carrier and in continuous meshing engagement with the third sun gear and the third ring gear.

9. The transmission of claim 8, further comprising:
a first clutch configured to selectively couple the first shaft to the input shaft;
a second clutch configured to selectively couple the second shaft to the input shaft;
a first brake configured to selectively hold the second shaft against rotation;
a second brake configured to selectively hold the third shaft against rotation; and
a third brake configured to selectively hold the third ring gear against rotation.

10. The transmission of claim 5 wherein the layshaft gearing arrangement comprises:
a layshaft substantially parallel to the input shaft;
a second axis transfer gear coupled to the input shaft;
a third axis transfer gear coupled to the layshaft and in continuous meshing engagement with the second axis transfer gear; and
a fourth axis transfer gear fixedly coupled to the layshaft and in continuous meshing engagement with the first axis transfer gear.

11. The transmission of claim 10 wherein:
the second axis transfer gear is fixedly coupled to the input shaft; and
the third axis transfer gear is selectively coupled to the layshaft by a sixth shift element.

12. The transmission of claim 5 wherein the seventh forward speed ratio is an overdrive speed ratio.

13. A transmission comprising:
an input shaft;
an output shaft;
first, second, third, fourth, fifth, sixth, and seventh shafts;
first, second, and third brakes;
first, second, and third clutches;
a first gearing arrangement configured to fixedly impose a linear speed relationship among the input shaft, the first shaft, and the second shaft;
a second gearing arrangement configured to fixedly impose a linear speed relationship among the third shaft, the output shaft, and the fourth shaft;
a third gearing arrangement configured to fixedly impose a linear speed relationship among the fifth shaft, the sixth shaft, and the seventh shaft;
a layshaft substantially parallel to the input shaft;
a first axis transfer gear coupled to the input shaft;
a second axis transfer gear coupled to the layshaft and in continuous meshing engagement with the first axis transfer gear;
a third axis transfer gear fixedly coupled to the output shaft; and
a fourth axis transfer gear fixedly coupled to the layshaft and in continuous meshing engagement with the third axis transfer gear.

14. The transmission of claim 13, wherein the first gearing arrangement is a first simple planetary gearset having a first sun gear fixedly coupled to the input shaft, a first ring gear fixedly coupled to the second shaft, a first planet carrier fixedly coupled to the first shaft, and at least one planet gear supported for rotation on the first planet carrier and in continuous meshing engagement with the first sun gear and the first ring gear.

15. The transmission of claim 13, wherein the second gearing arrangement is a second simple planetary gearset having a second sun gear fixedly coupled to the third shaft, a second ring gear fixedly coupled to the fourth shaft, a second planet carrier fixedly coupled to the output shaft, and at least one planet gear supported for rotation on the second planet carrier and in continuous meshing engagement with the second sun gear and the second ring gear, and the first brake is configured to selectively hold the third shaft against rotation.

16. The transmission of claim 13, wherein the third gearing arrangement is a third simple planetary gearset having a third sun gear fixedly coupled to the fifth shaft, a third ring gear fixedly coupled to the seventh shaft, a third planet carrier fixedly coupled to the sixth shaft, and at least one planet gear supported for rotation on the third planet carrier and in continuous meshing engagement with the third sun gear and the third ring gear.

17. The transmission of claim 16, wherein the second brake is configured to selectively hold the fifth shaft against rotation, the third brake is configured to selectively hold the sixth shaft against rotation, and the seventh shaft is coupled to the output shaft.

18. The transmission of claim 13, wherein the first gearing arrangement is a first simple planetary gearset having a first sun gear fixedly coupled to the input shaft, a first ring gear fixedly coupled to the second shaft, a first planet carrier fixedly coupled to the first shaft, and at least one planet gear supported for rotation on the first planet carrier and in continuous meshing engagement with the first sun gear and the first ring gear, and the first brake is configured to selectively hold the second shaft against rotation.

19. The transmission of claim 13, wherein the second gearing arrangement is a second simple planetary gearset having a second sun gear fixedly coupled to the third shaft, a second ring gear fixedly coupled to the fourth shaft, a second planet carrier fixedly coupled to the output shaft, and at least one planet gear supported for rotation on the second planet carrier and in continuous meshing engagement with the second sun gear and the second ring gear, the first clutch is configured to selectively couple the third shaft to the input shaft, the second clutch is configured to selectively couple the fourth shaft to the input shaft, and the second brake is configured to selectively hold the fourth shaft against rotation.

20. The transmission of claim 13, wherein the third gearing arrangement is a third simple planetary gearset having a third sun gear fixedly coupled to the fifth shaft, a third ring gear fixedly coupled to the seventh shaft, a third planet carrier fixedly coupled to the sixth shaft, and at least one planet gear supported for rotation on the third planet carrier and in continuous meshing engagement with the third sun gear and the third ring gear, the fifth shaft is coupled with the third shaft, the sixth shaft is coupled with the fourth shaft, the seventh shaft is coupled with the first shaft, and the third brake is configured to selectively hold the seventh shaft against rotation.

* * * * *